United States Patent
Liu et al.

(10) Patent No.: US 8,935,893 B2
(45) Date of Patent: Jan. 20, 2015

(54) DIRECT ROOFTOP MOUNTING APPARATUS FOR SOLAR PANELS

(71) Applicant: Sunmodo Corporation, Vancouver, WA (US)

(72) Inventors: Jun Liu, Camas, WA (US); Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 13/907,548

(22) Filed: May 31, 2013

(65) Prior Publication Data
US 2014/0353435 A1   Dec. 4, 2014

(51) Int. Cl.
F24J 2/52   (2006.01)
F16L 3/06   (2006.01)

(52) U.S. Cl.
CPC ............... *F24J 2/5245* (2013.01); *F16L 3/06* (2013.01); *F24J 2/5258* (2013.01)
USPC ........... 52/173.3; 248/237; 126/623; 136/244

(58) Field of Classification Search
CPC .............. H01L 31/048; H01L 31/0482; H01L 31/0483; H01L 31/0484; F24J 2/045; Y02B 10/12; Y02B 10/47
USPC ............... 248/74.1, 188.1, 201, 237, 220.22, 248/228.1, 250, 316.1; 52/173.3, 766, 767, 52/549, 208, 204.62, 204.64, 204.65, 52/204.75; 126/621–623, 696; 136/244, 136/251
See application file for complete search history.

(56) References Cited

U.S. PATENT DOCUMENTS

| | | | |
|---|---|---|---|
| 5,924,213 A | 7/1999 | Lee | |
| 5,974,758 A * | 11/1999 | Pielmeier | 52/656.2 |
| 6,105,317 A * | 8/2000 | Tomiuchi et al. | 52/173.3 |

(Continued)

FOREIGN PATENT DOCUMENTS

| | | |
|---|---|---|
| CN | 201915565 U | 8/2011 |
| JP | 2001156322 A | 6/2001 |

(Continued)

OTHER PUBLICATIONS

Sunmodo Solar Racking Systems Product Catalog, Jun. 25, 2010, Sunmodo Corporation, Vancouver, WA.

(Continued)

*Primary Examiner* — Jonathan Liu
*Assistant Examiner* — Guang H Guan
(74) *Attorney, Agent, or Firm* — Stone Creek Services LLC; Alan M. Flum

(57) ABSTRACT

Disclosed is an apparatus for mounting solar panels and other rooftop objects to a shingle roof or other roof structures. The apparatus includes a panel-mount and a base-plate. The base-plate is securable to the roof structures. The panel-mount can be secured to the base-plate and intermediary flashing plate. The panel-mount includes vertical sidewalls adapted to receive and hold wires, and panel-mount top surface adapted to seat solar panels. In one aspect, the panel-mount top surface includes an alignment projection adapted to align solar panels in one of two orthogonal directions. Grounding pins are arranged in a square pattern and aligned with the corners of the alignment projection in order to assure that the solar panel frame will make contact with at least two of the grounding pins in either of the two possible alignments.

2 Claims, 13 Drawing Sheets

(56) References Cited

U.S. PATENT DOCUMENTS

| | | | |
|---|---|---|---|
| 6,526,701 B2* | 3/2003 | Stearns et al. | 52/24 |
| 6,679,011 B2 | 1/2004 | Beck et al. | |
| 6,715,240 B2 | 4/2004 | Beck et al. | |
| 6,758,625 B1* | 7/2004 | Lawrence | 403/388 |
| 7,435,134 B2 | 10/2008 | Lenox | |
| 7,592,537 B1* | 9/2009 | West | 136/251 |
| 8,122,648 B1 | 2/2012 | Liu | |
| 8,136,311 B2 | 3/2012 | Liu | |
| 8,177,180 B2 | 5/2012 | Plaisted et al. | |
| 8,191,321 B2* | 6/2012 | McClellan et al. | 52/173.3 |
| 8,272,189 B2* | 9/2012 | Chan et al. | 52/792.11 |
| 8,495,839 B2* | 7/2013 | Tsuzuki et al. | 52/173.3 |
| 8,505,864 B1* | 8/2013 | Taylor et al. | 248/237 |
| 2007/0157963 A1* | 7/2007 | Metten et al. | 136/251 |
| 2008/0000173 A1* | 1/2008 | Lenox et al. | 52/173.1 |
| 2010/0084520 A1* | 4/2010 | Ohno | 248/74.1 |
| 2010/0192505 A1 | 8/2010 | Schaefer et al. | |
| 2011/0179727 A1 | 7/2011 | Liu | |
| 2011/0209745 A1* | 9/2011 | Korman et al. | 136/251 |
| 2011/0214366 A1 | 9/2011 | Haddock et al. | |
| 2011/0214367 A1 | 9/2011 | Haddock et al. | |
| 2011/0214368 A1 | 9/2011 | Haddock et al. | |
| 2012/0102853 A1 | 5/2012 | Rizzo | |
| 2012/0144760 A1 | 6/2012 | Schaefer et al. | |
| 2012/0175322 A1* | 7/2012 | Park et al. | 211/41.1 |
| 2012/0192925 A1 | 8/2012 | Grushkowitz et al. | |
| 2012/0233958 A1 | 9/2012 | Stearns | |
| 2012/0261526 A1* | 10/2012 | Rentfrow | 248/68.1 |
| 2013/0174891 A1* | 7/2013 | Tseng et al. | 136/251 |
| 2013/0192150 A1 | 8/2013 | DuPont et al. | |
| 2013/0284238 A1* | 10/2013 | Park | 136/251 |
| 2013/0291479 A1* | 11/2013 | Schaefer et al. | 52/745.21 |

FOREIGN PATENT DOCUMENTS

| | | |
|---|---|---|
| KR | 1020110139382 A | 12/2011 |
| WO | 2012134830 A2 | 10/2012 |
| WO | 2013033404 A2 | 3/2013 |

OTHER PUBLICATIONS

Screenshot from slideshow on home page of Solattach, accessed on the Internet at: http://www.solattach.com/ on Apr. 8, 2013.

Ez Mount L Foot for Shingle Roofs, Mar. 23, 2011, pp. 1-2, Sunmodo Corporation, Vancouver, WA.

Muhammad Ijaz, Non Final Office Action, U.S. Appl. No. 14/054,759, filed Oct. 15, 2013, Inventor: Jun Liu, Date of Office Action: Jun. 17, 2014, United States Patent and Trademark Office, Alexandria, VA.

* cited by examiner

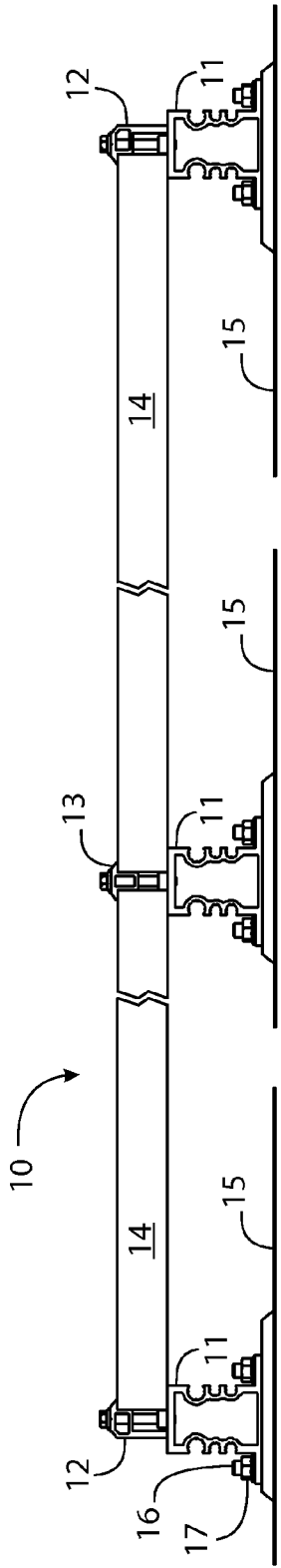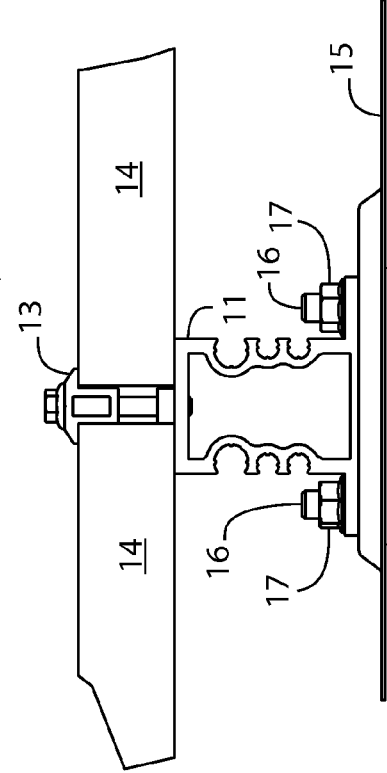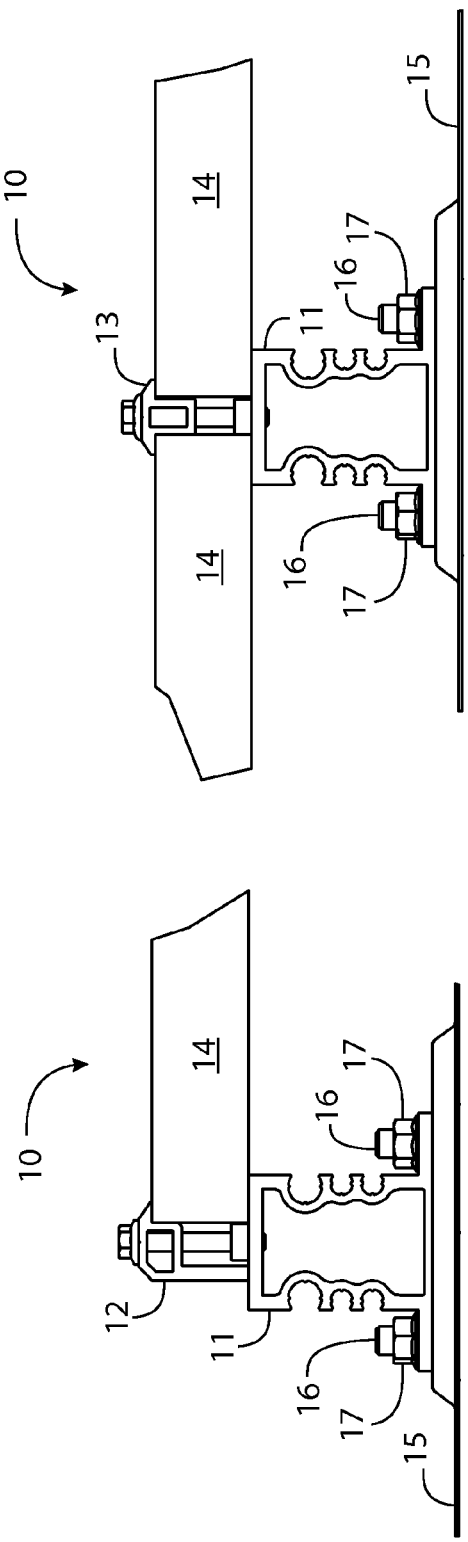

DIRECT ROOFTOP MOUNTING APPARATUS FOR SOLAR PANELS

BACKGROUND

The present disclosure relates to an apparatus for mounting solar panels and other roof top equipment to a roof. For the purpose of this disclosure the term solar panel refers to devices that collect energy from the sun, for example, a solar photovoltaic (PV) panel or solar hot water heater panel.

Typically, solar panels can be mounted to shingle, metal, or tile roofs using a mounting system that includes rails for supporting one or more solar panels and brackets for holding solar panels to the roof. The mounting systems are often coupled with flashing plates or other water proofing provisions for preventing water from penetrating the roof sheeting.

Using rails for mounting solar panels requires the cost of purchasing and transporting the rails as well as the labor cost of installing and cutting the rails on site. In addition, long lengths or rails are susceptible to thermal expansion and contraction. For example, a 100 ft. (30.48 m) length of aluminum rail can expand or contract 1.5 in (0.038 m) over a seasonal variation of 100 F (54.5 C) typical in many regions of the world. This may cause damage to the solar panel-mounting system including buckling of components and detachment of mounting bolts.

SUMMARY

The present disclosure overcomes the problems described in the Background section associated with rails, by providing a rail-less solar panel-mounting system. The rail-less solar panel-mounting system includes a panel-mount and a base-plate. The panel-mount includes a panel-mount top surface, two vertical sidewalls, and a panel-mount base. The base-plate is secured to the roof by threaded fasteners and can be covered by a cavity formed by a raised portion of a flashing plate. The panel-mount is secured to the base-plate through the flashing-plate. The panel-mount top surface is substantially planar in order to flatly mount one or more solar panels. The solar panels are secured to the panel-mount top surface by either a solar panel end-clamp or mid-clamp in combination with a machine-threaded fastener.

The vertical sidewalls include wire-mounting portions. The space between the vertical sidewalls defines a hollow cavity that can route or dress wire. The wire-mounting portions include a cavity formed inward from the outer surface of the vertical sidewalls and an opening on the outer surface of the vertical sidewall. The height of the opening is smaller than the height of the cavity. In one aspect, the profile of the combination of the cavity and the opening form an arcuate in shape or alternatively a portion of a circular or elliptical cross section. In another aspect, the cavity includes rounded projections, and at least two of the rounded projections on opposing surfaces of the cavity. The rounded projections run along the front to back length of the cavity. Each wire-mounting portion can be designed to hold a specific gauge of insulated wire. The height of the cavity is approximately the same width as the wire's cross-section. The height of the opening is slightly smaller than the wire's cross-section so as to compress the insulation jacket of the wire as it is passed into the cavity. This arrangement holds the wire securely in the cavity. The optional rounded projections act to compress the insulation once the wire is in the cavity in order to further hold the wire in place.

In one aspect, the base-plate includes threaded standoffs, positioned on opposing sides of base-plate. The threaded standoffs project upward from the base-plate. The base-plate includes grooves encircling each of the threaded standoffs. Each groove receives and seats an elastomeric washer. The base-plate includes a pair of apertures orthogonally positioned in relationship to the threaded standoffs. The position maximizes the mounting strength of the base-plate against forces applied to the panel-mount. A recess encircles the base-plate apertures. The base-plate apertures are sized to receive and pass a threaded fastener for securing the base-plate to the roof. The recess is sized to receive and seat the head of the threaded fastener.

The panel-mount base includes apertures. The panel-mount base apertures are sized to receive a corresponding threaded standoff through a corresponding aperture in raised portion of the flashing plate. Nuts engage the threaded standoff and secure the panel-mount to the base-plate. When the nuts are tightened to the threaded standoff and the elastomeric washer creates a watertight seal under the aperture in the flashing plate.

In another aspect, the base-plate, instead of the thread standoff includes a hollow projection, projecting upward from the base-plate. The hollow projection is threaded on its exterior surface. The apertures in flashing plate and the panel-mount base are sized to receive the hollow projection. A hollow cap with interior threading engages the hollow projection and secures the panel-mount and flashing to the base-plate. The aperture of the hollow projection is sized to receive and pass through the body of a threaded fastener and seat the head of the threaded fastener. The threaded fastener secures the base-plate to the roof.

In another aspect, the panel-mount top surface is approximately planar so as to receive and seat the bottom surface of the solar panel. The panel-mount top surface includes an alignment projection. The alignment projection is approximately centered on the panel-mount top surface. The top surface of the alignment projection can be square or rectangular shaped. Grounding pins can be arranged so at least one grounding pin is placed in each of four regions bound by lines extending outward from and parallel to adjacent sides of the alignment projection and by the edges of the panel-mount top surface. For example, the grounding pins can be placed in a square pattern and aligned with the corners of the alignment projection. The rectangular shape of the alignment projection allows for two possible orthogonally opposed alignments of the solar panels. The rectangular shape of the alignment projection in combination with the specific arrangement of the grounding pins ensures that the solar panel will make contact with at least two of the grounding pins in either of the two possible alignments.

This Summary has introduced a selection of concepts in simplified form that will be later described the Description. The Summary is not intended to identify essential features or limit the scope of the claimed subject matter.

DRAWINGS

FIG. 2 shows a front view of FIG. 1.

FIG. 3 shows a detailed view of a portion of FIG. 2 showing the panel-mount and an end-clamp.

FIG. 4 shows a detailed view of a portion of FIG. 2 showing the panel-mount and a mid-clamp.

DESCRIPTION

The terms "left", "right", "front", "back", and "side" are relative terms used throughout the disclosure to aid in the understanding of the figures. Unless otherwise indicated, these terms are not used to denote absolute direction, or orientation. They are not meant to imply a particular preference or limitation for a particular orientation or direction.

Figure 1:
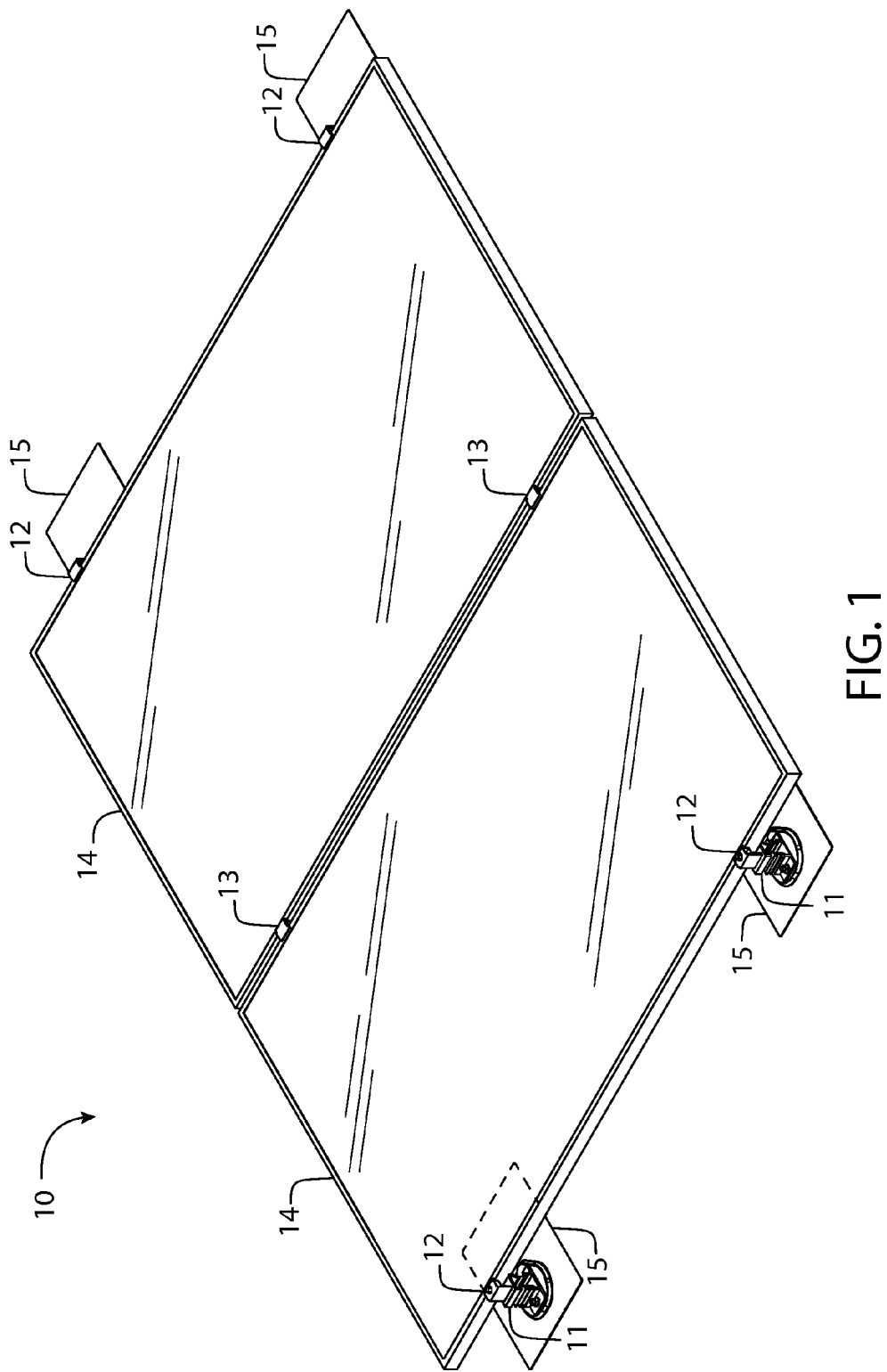
FIG. 1 shows a rail-less solar panel-mounting system.
Figure 5:
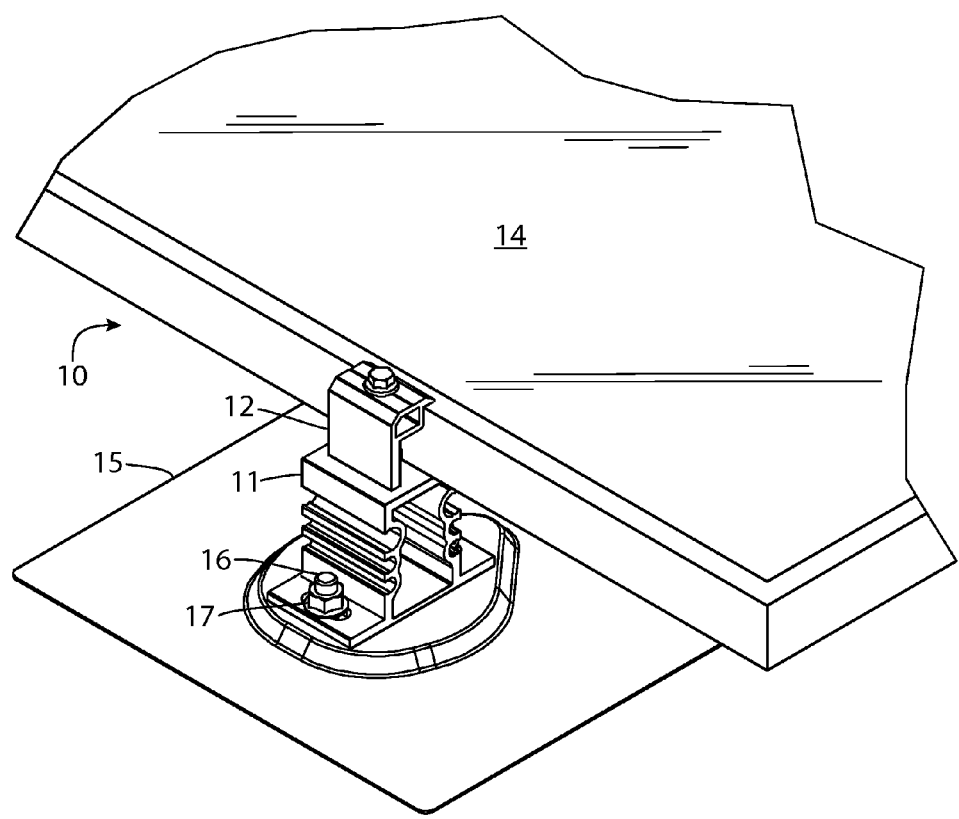
FIG. 5 shows, in front perspective view, a detailed view of a portion of FIG. 1.

The following description is made with reference to figures, where like numerals refer to like elements throughout the several views, FIG. 1 shows a solar panel-mounting system 10 that does not require rails. FIG. 2 shows a front view of FIG. 1. FIG. 3 shows a detailed view of a portion of FIG. 2 showing a panel-mount 11 and an end-clamp 12. FIG. 4 shows a detailed view of a portion of FIG. 2 showing the panel-mount 11 and a mid-clamp 13. FIG. 5 shows, in front perspective view, a detailed view of a portion of FIG. 1.

Referring to FIGS. 1-5, solar panel-mounting system 10 includes the panel-mount 11, one or more solar panels 14, and a flashing plate 15. In FIGS. 1-3, and 5, the solar panels 14 can be secured to the panel-mounts 11 by the end-clamp 12 or in FIGS. 1-2, and 4 by mid-clamps 13. In FIGS. 2-5, the panel-mount 11 is secured to the flashing plate 15 by a threaded standoff 16 or stud and a nut 17.

Figure 6:
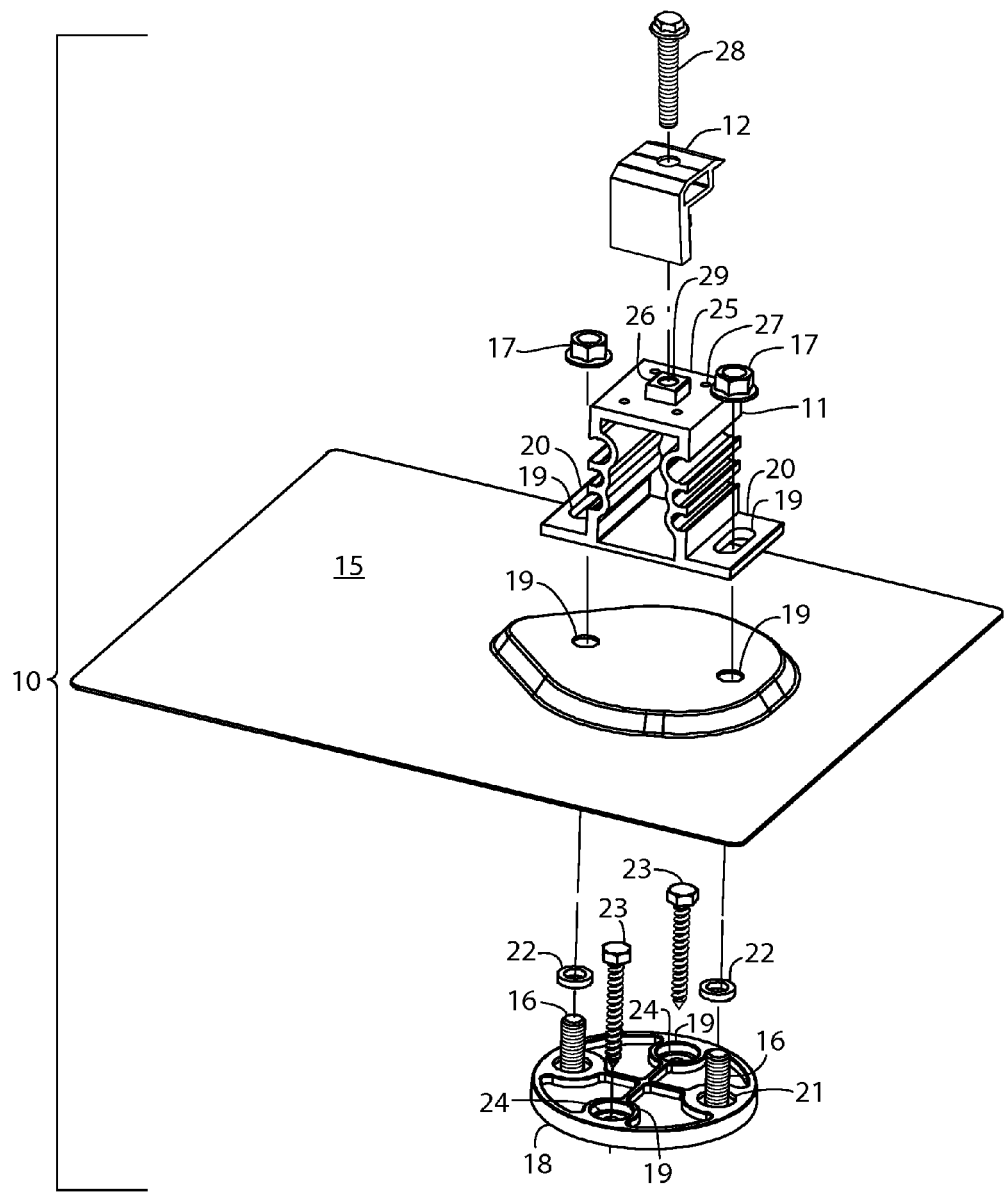
FIG. 6 shows, a front perspective exploded view of the solar panel-mounting apparatus.

In FIG. 6, which is an exploded view of the solar panel-mounting system 10, the threaded standoff 16, is integral to a base-plate 18. The threaded standoff can be integrally attached, for example, swedged into the base-plate 18, or alternatively can be integrally formed into the base-plate 18. The nuts 17 secure the panel-mount 11 to the threaded standoffs 16 through apertures 19 in the flashing plate 15 and panel-mount base 20. The aperture 19 in the panel-mount base 20 is shown as a slotted aperture however, this can also be a round aperture.

One of the challenges in flashing plate based solar panel-mounting systems is to prevent water damage to the roof caused by leaks in the mounting structure. Often waterproofing comes at the cost of simplicity of design. The solar panel-mounting system 10 disclosed solves the problem of waterproofing but still maintains simplicity of design. The base-plate 18 includes grooves 21 encircling each of the threaded standoffs 16. Each groove 21 receives and seats an elastomeric washer 22. When the nut 17 is tightened to the threaded standoff 16 the elastomeric washer 22 creates a watertight seal under the aperture 19 in the flashing plate 15. The base-plate 18 is secured to the roof by threaded fasteners 23. The threaded fasteners 23 shown in FIG. 6 are lag bolts as this can secure the base to a truss rafter in a shingle roof. Alternatively, the threaded fasteners 23 can be wood screws or other types of threaded fasteners, as appropriate, depending on the roof type. The base-plate 18, as illustrated, includes an aperture 19 for receiving and passing through the threaded fastener 23 and a recess 24 encircling the aperture 19; the recess 24 is sized to receive and seat the head of the threaded fastener 23. The pair of threaded fasteners 23 is shown positioned on opposing sides of the base-plate 18. The pair of threaded standoffs 16 is shown in a position on the base-plate 18 that is orthogonally opposed to the threaded fasteners 23. The position maximizes the mounting strength of the base-plate 18 against forces applied to the panel-mount 11. In addition, since the base-plate is protected from water infiltration by the elastomeric washers 22 surrounding the threaded standoffs 16, it is not necessary to water seal the threaded fasteners 23.

Figure 7:
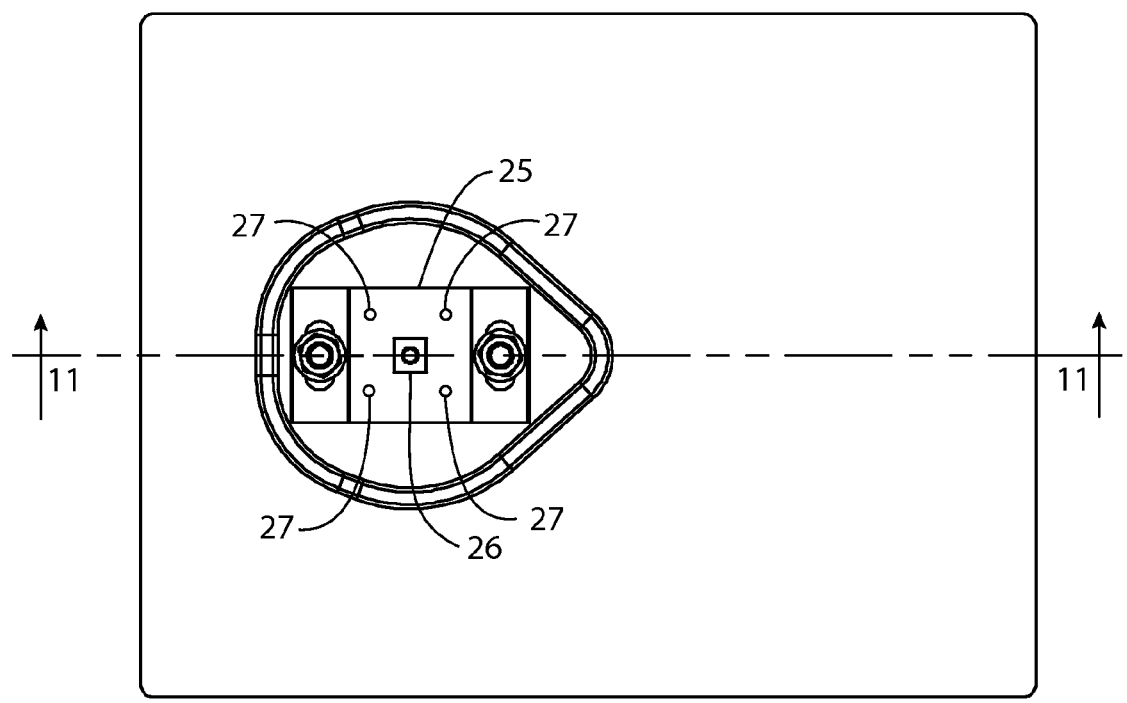
FIG. 7 shows, a top plan view of the solar panel-mounting apparatus.

The panel-mount top surface 25 shown in FIG. 6 is approximately planar so as to receive and seat the bottom surface of the solar panels 14 of FIGS. 2-5. In FIGS. 6-7, the panel-mount top surface 25 includes an alignment projection 26. The alignment projection 26 is shown centered on the panel-mount top surface 25. The top surface of the alignment projection 26 is shown as square shaped. Grounding pins 27 are shown arranged in a square pattern and aligned with the corners of the alignment projection 26. This square shape of the alignment projection 26 allows for two possible orthogonally opposed alignments of the solar panels 14. The square shape of the alignment projection 26 in combination with the specific arrangement of the grounding pins 27 ensures that the solar panel 14 will make contact with at least two of the grounding pins 27 in either of the two possible alignments. FIG. 6 also shows the end-clamp 12 and a machine-thread fastener 28. The machine thread fastener secures the end-clamp 12 to the panel-mount top surface 25 by engaging a threaded aperture 29 centered in the top surface of the alignment projection 26.

Figure 8:
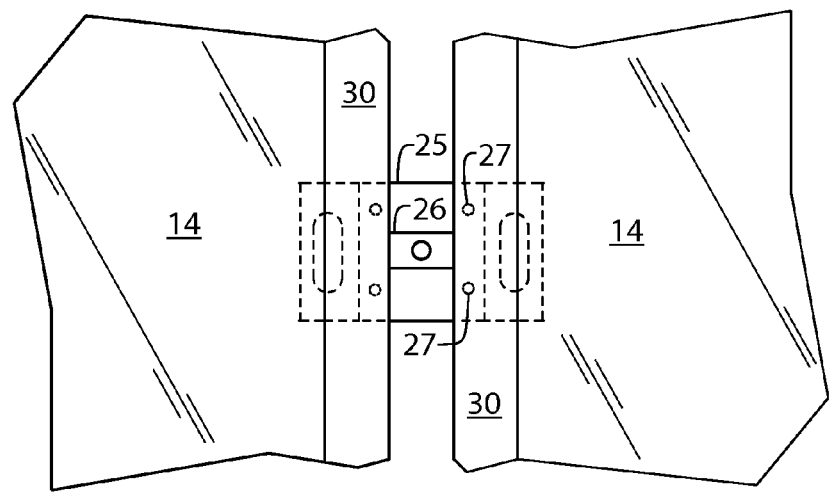
FIG. 8 shows a top view of panel-mount in relationship to solar panels mounted in the first of two directions.
Figure 9:
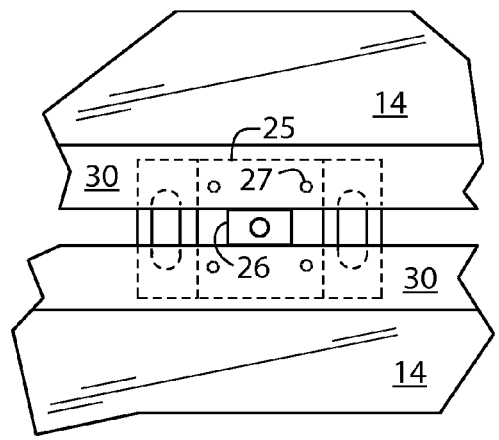
FIG. 9 shows a top view of the panel-mount in relationship to solar panels mounted in the second of two directions.

FIGS. 8-9, shows, in top view, the solar panels 14 in each of the two possible alignments in relationship to the panel-mount top surface 25. The grounding pins 27 and a portion of the panel-mount top surface 25 are hidden under the solar panel and are represented by broken lines. The alignment projection 26 shown is rectangular in shape. The alignment projection 26 and panel-mount top surface 25 are sized so that the solar panel metal frame 30 is supported by the panel-mount top surface.

Figure 10:
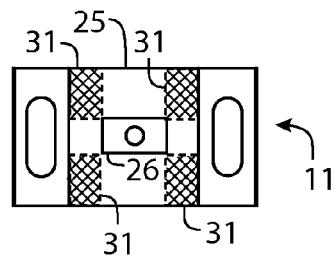
FIG. 10 shows a top view of the panel-mount showing the grounding pin mounting regions.

In FIGS. 8-9, the grounding pins 27 are shown forming an approximately square pattern and aligned with the vertices of the alignment projection 26. In general, in order for at least two of the grounding pins 27 to electrically contact with each of the solar panel metal frames 30, in either of the two possible alignments allowed by the alignment projection 26, at least one of the grounding pin 27 must be placed in each of four grounding pin placement regions 31 on the panel-mount top surface 25 as shown for the panel-mount 11 in FIG. 10. Each of the grounding pin placement regions 31 is defined as a region bound by lines extending outward from and parallel to adjacent sides of the alignment projection 26, and by the edges of the panel-mount top surface 25. This is illustrated in FIG. 10 by cross-hatching.

Figure 11:
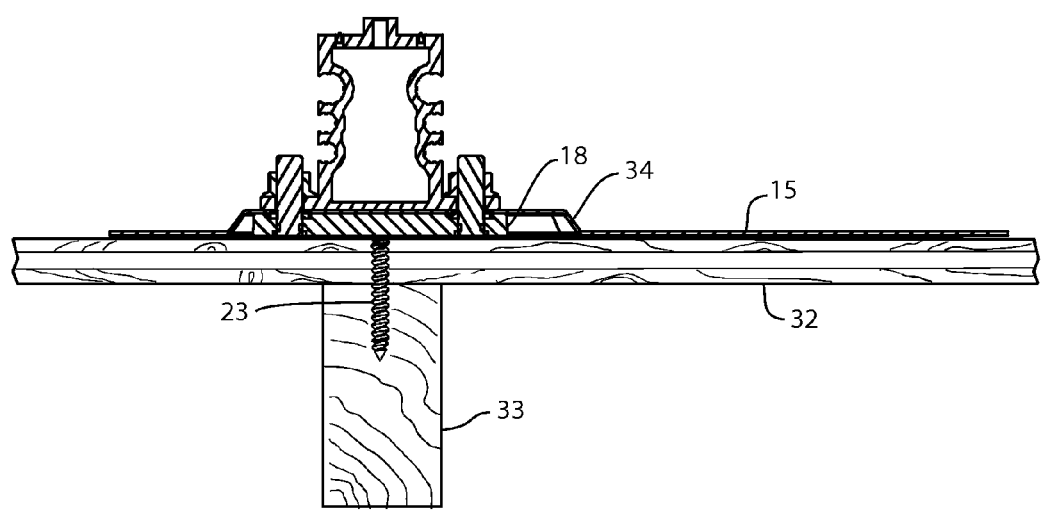
FIG. 11 shows, a sectional view of FIG. 7.

FIG. 11 shows, a sectional view of FIG. 7. One of the threaded fasteners 23 is visible in the view and shown securing the base-plate 18 to the wood sheeting 32 and the truss joist 33 of the roof structure. A raised portion 34 of the flashing plate 15 creates a cavity for mounting the base-plate 18 and also serves to deflect water.

Figure 12:
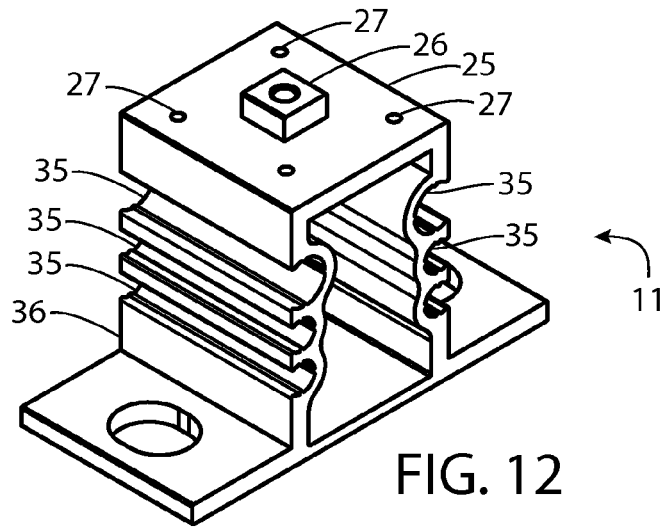
FIG. 12 shows, in perspective view, the panel-mount portion of the solar panel-mounting apparatus.
Figure 13:
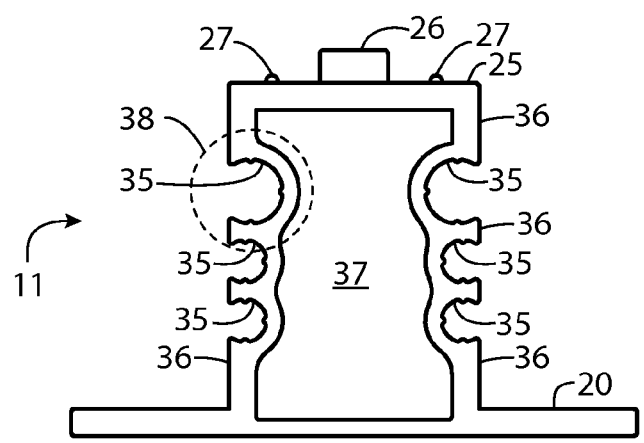
FIG. 13 shows a front view of FIG. 12.

FIG. 12 shows, in perspective view, the panel-mount 11. FIG. 13 shows a front view of panel-mount 11. FIGS. 12-13 show the grounding pins 27 and alignment projection 26 in relation to the panel-mount top surface 25. One of the problems with solar panel-mounting systems is how to dress and route the electrical wires. In order to address this problem, the panel-mount 11 includes wire-mounting portions 35 on the vertical sidewalls 36 of panel-mount 11. The wire-mounting portions 35 are shaped to receive and hold electrical wires. The wire-mounting portions 35 are shown having a partial circular profile where the groove opening is narrower than the diameter of the circular cross-section. This allows wires that are approximately the diameter of the circular profile, and that have a flexible insulation jacket, to be pressed in the opening and stay captive. FIG. 13 shows a hollow cavity 37 that is defined by the space between the vertical sidewalls 36, below the panel-mount top surface 25, and above the panel-mount base 20. Wires that are secured to the wire-mounting portions 35 can be bent and routed through the opening or excess wire can be dressed or bundled in the opening.

Figure 14:
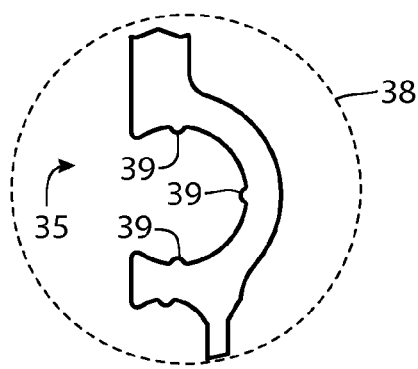
FIG. 14 shows a detailed view of a portion of FIG. 13.

FIG. 14 shows a detailed view 38 of a wire-mounting portion 35 of FIG. 13. The wire-mounting portion 35 is shown with rounded projections 39, each along the length of the wire-mounting portion 35. The rounded projections 39 are so called because they include a smooth or rounded upper surface that does not pierce the insulation of the wiring. The rounded projections 39 compress the flexible insulation jacket of the wiring. This helps to further hold the wiring in place. While a circular profile is shown, other arcuate profiles can be used as long as either the groove opening is smaller than the cavity or if the groove opening is not smaller than the cavity than the cavity wall includes rounded projections 39 on opposing cavity walls portions.

Figure 15:
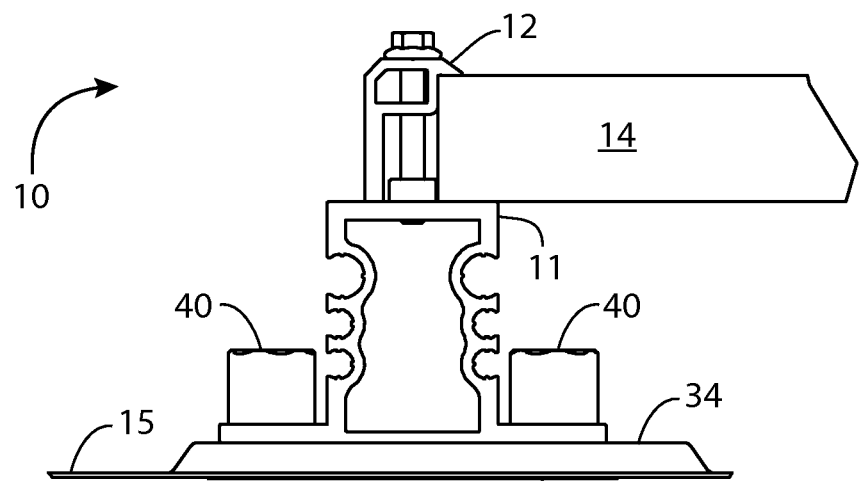
FIG. 15 shows a portion of the rail-less solar panel-mounting system with an alternative base and fastening system, coupled to an end-clamp.
Figure 16:
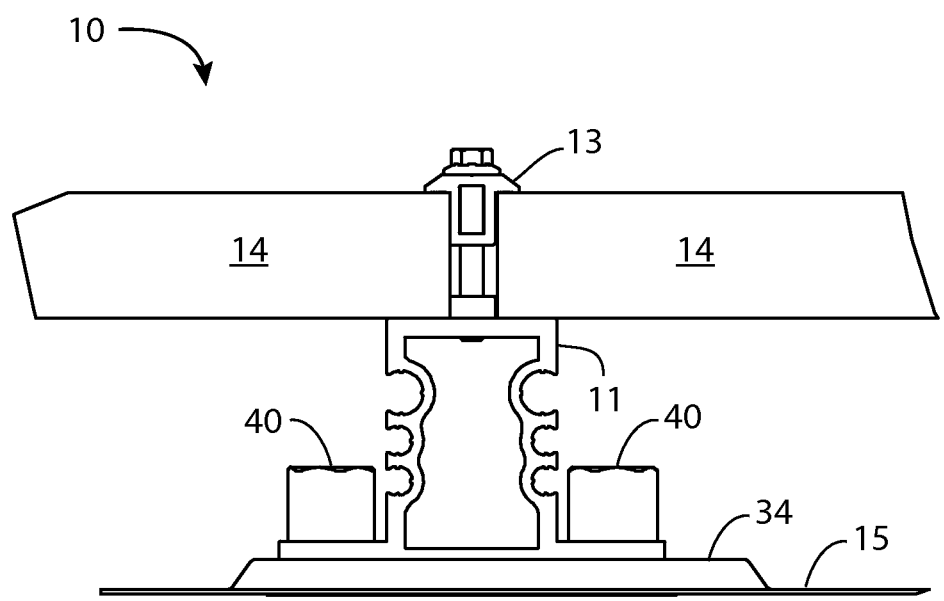
FIG. 16 shows a portion of the rail-less solar panel-mounting system with an alternative base and fastening system, coupled to a mid-clamp.
Figure 17:
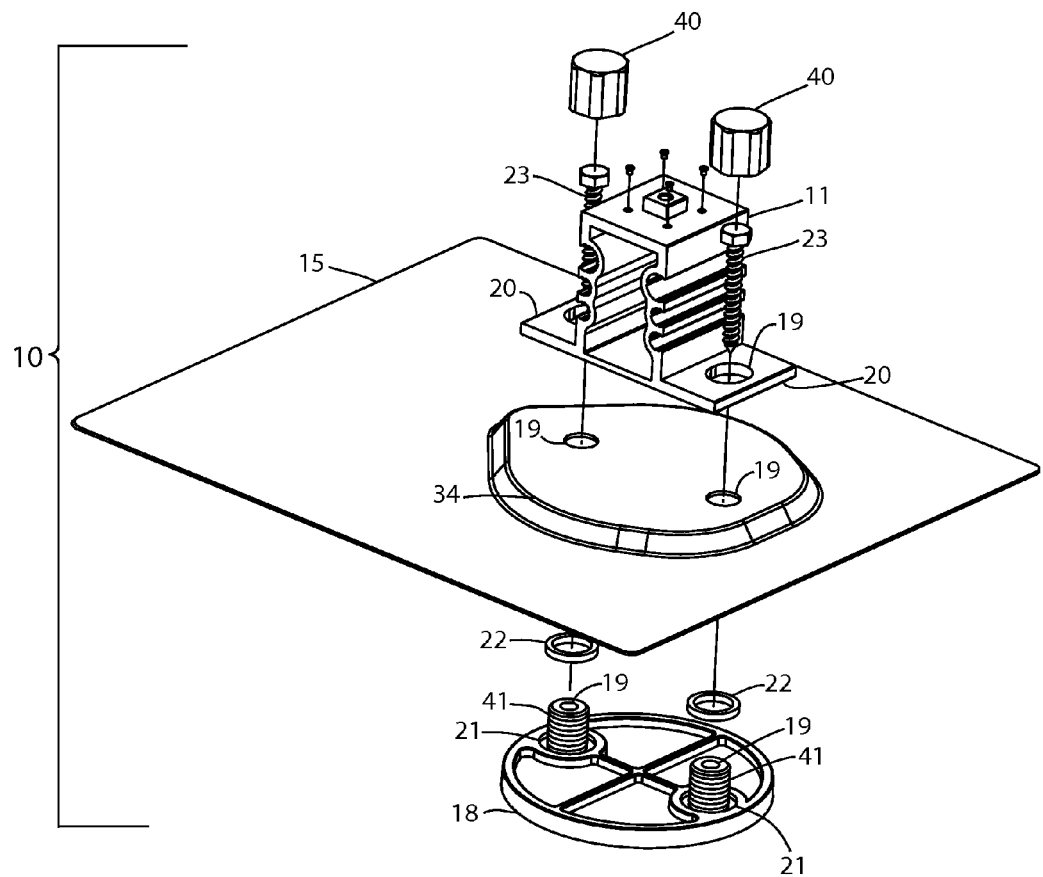
FIG. 17 shows an exploded perspective view of the rail-less solar panel-mounting system of FIG. 15.
Figure 18:
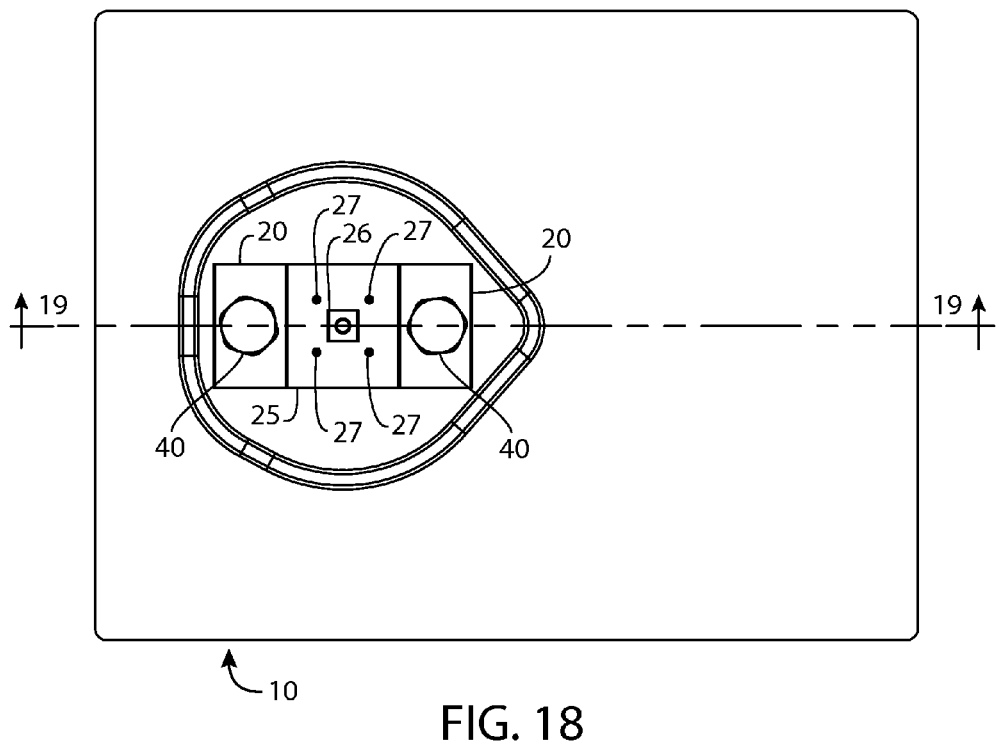
FIG. 18 shows a top view of the rail-less solar panel-mounting system of FIG. 15.
Figure 19:
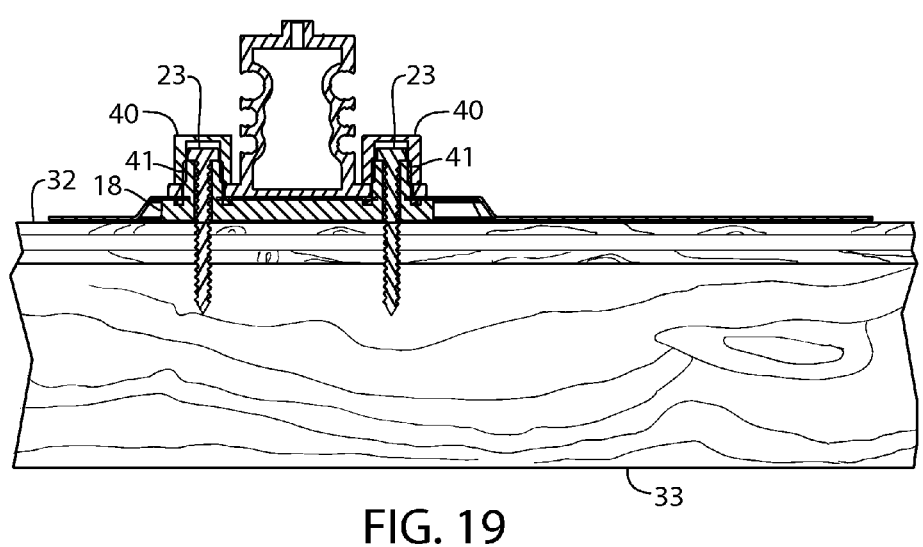
FIG. 19 shows a sectional view of FIG. 18.

FIG. 15 shows a portion of the solar panel-mounting system 10 that includes an alternative base and fastening system showing the solar panel 14 coupled to the end-clamp 12. FIG. 16 shows a portion of the solar panel-mounting system 10 with an alternative base and fastening system, showing the solar panels 14 coupled to the mid-clamp 13. FIG. 17 shows an exploded perspective view of the solar panel-mounting system 10 of FIG. 15. FIG. 18 shows a top view of the solar panel-mounting system 10 of FIG. 15 including the panel-mount top surface 25, panel-mount base 20, the alignment projection 26, and the position of the grounding pins 27 in relation to the alignment projection 26, as previously described. FIG. 18 also shows hollow caps 40. FIG. 19 shows a sectional view of FIG. 18. In FIGS. 15-16, the hollow cap 40 helps to secure the panel-mount 11 the raised portion 34 of the flashing plate 15. In FIGS. 17 and 19, the hollow cap 40 engages a hollow projection 41 extending upward from the surface of the base-plate 18. The interior of the hollow cap 40 and the exterior of the hollow projection 41 have complementary threading allowing the hollow cap 40 and the hollow projection 41 to be removably secured.

Referring to FIG. 17, the aperture 19 in the hollow projection is wide enough to pass the body of the threaded fastener 23 but narrow enough to leave a shoulder for seating the head of the threaded fastener 23. The apertures 19 in both the raised portion 34 of the flashing plate 15 and the panel-mount base 20 of the panel-mount 11 are wide enough to pass the hollow projections 41 but narrower than the exterior of the hollow cap 40. The base-plate 18 includes grooves 21 encircling each of the hollow projections 41. Each groove 21 receives and seats an elastomeric washer 22. When the hollow cap 40 is tightened to the hollow projection 41, the elastomeric washer 22 creates a watertight seal under the aperture 19 in the flashing plate 15. In FIG. 19, the threaded fastener 23 engages the wood sheeting 32 and the truss joist 33 to secure the base-plate 18 to the roof.

Figure 20:
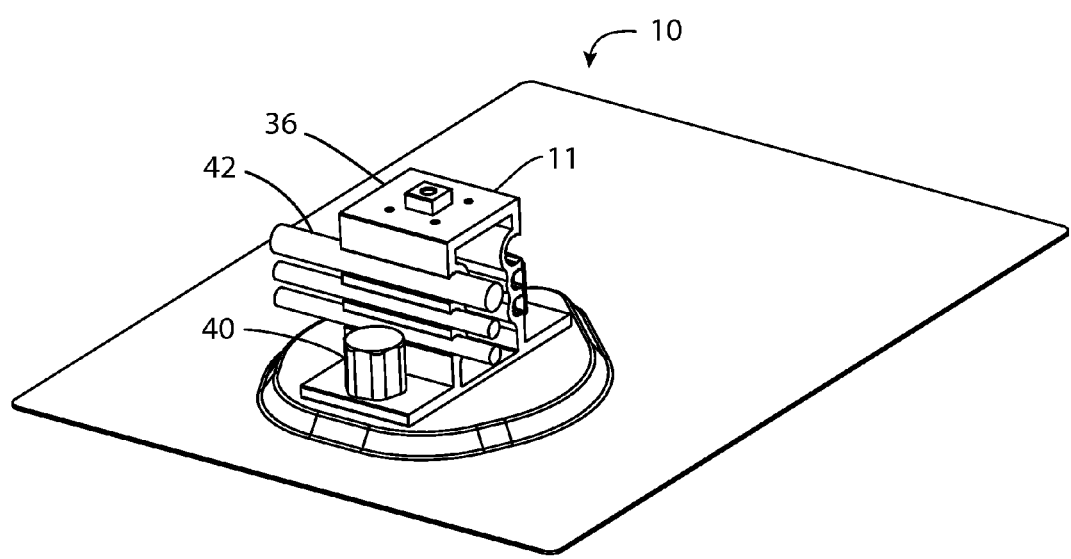
FIG. 20 shows a perspective view of the rail-less solar panel-mounting system of FIG. 15 showing electrical wires secured by the built-in wire channels.

FIG. 20 shows a perspective view of the solar panel-mounting system 10 of FIG. 15 showing electrical wiring 42 secured by the built-in wire channels in one of the vertical sidewalls 36 of the panel-mount 11. While FIG. 20 shows the panel-mount 11 in combination with the hollow caps 40, the wires are engaged in an equivalent manner in the panel-mount 11 of FIGS. 2-8.

Figure 21:
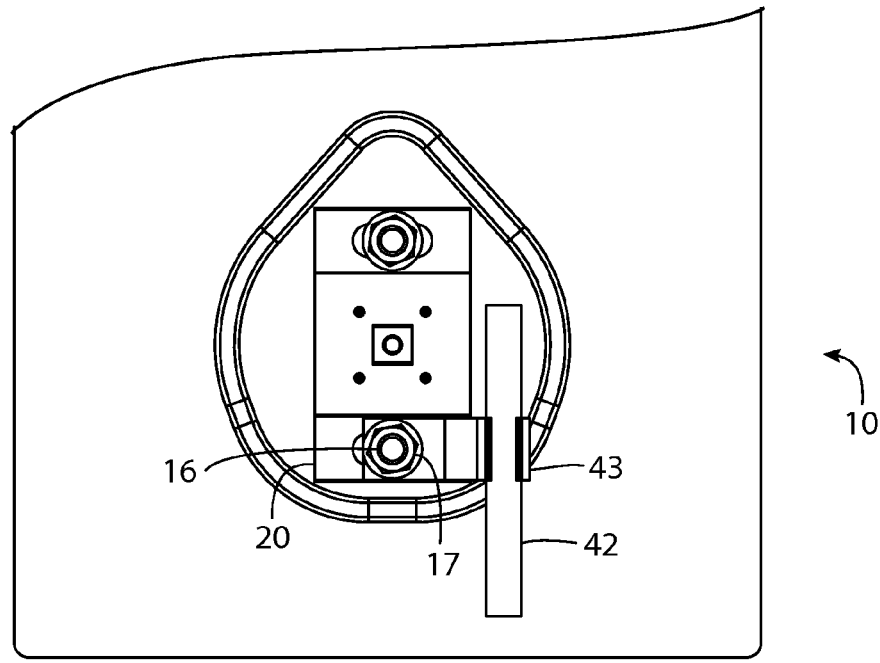
FIG. 21 shows a top plan view of the rail-less solar panel-mounting system of FIG. 5 showing electrical wires secured by an alternative wire-mounting clamp.
Figure 22:
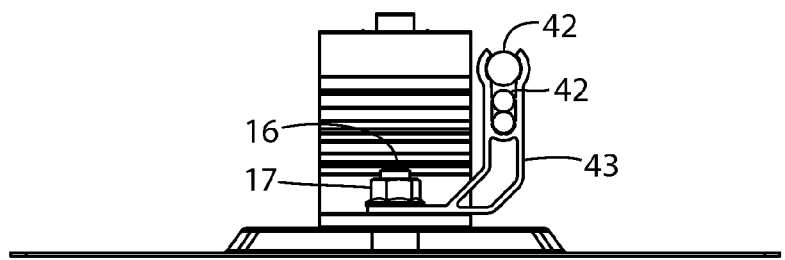
FIG. 22 shows side view of FIG. 21.

FIG. 21 shows a top plan view of the solar panel-mounting system 10, and FIG. 22 a side view of FIG. 21, showing electrical wiring 42 secured by an alternative wire-mounting clamp in the form of a wire-mounting bracket 43. The wire-mounting bracket 43 is secured to the panel-mount base 20 by the threaded standoff 16 and the nut 17. The nut 17 shown is a shoulder nut. However a regular nut and washer in combination can be used. Similarly, the wire-mounting bracket can be secured to the panel-mount base 20 by the hollow cap 40 and the hollow projection 41 of FIGS. 17 and 19.

Figure 23:
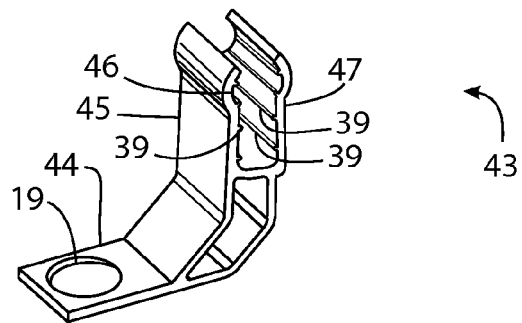
FIG. 23 shows a front perspective view of the alternative wire-mounting clamp of FIG. 21.

FIG. 23 shows a perspective view of the wire-mounting bracket 43. The wire-mounting bracket 43 includes an aperture 19 in wire-mounting bracket base portion 44. Depending on the application, the aperture can be sized to receive the hollow projection 41 of FIG. 17 or alternatively, the aperture can be large enough receive the threaded standoff of FIG. 21 but small enough so that the wire-mounting bracket base portion 44 can seat the nut 17 of FIG. 21. In FIG. 23, the wire-mounting bracket 43 includes wire-holding portion 45 projecting upwardly and approximately perpendicular to that the wire-mounting bracket base portion 44. The wire-holding portion 45 includes an upper wire-holding portion 46 with two arcuate sidewalls and a lower wire-holding portion 47 with substantially parallel sides. The lower wire-holding portion 47 includes rounded projections 39 extending along the front to back plane, i.e. longitudinally, along the lower wire-holding portion 47. This arrangement allows smaller wires to be stacked in the lower wire-holding portion 47 and held securely by the rounded projections 39 while holding a larger wire in the upper wire-holding portion 46.

An apparatus and method for mounting solar panels on roofs has been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A device for mounting a solar panel, the device including:
    a panel-mount, including a planar top adapted to receive the solar panel;
    the planar top includes a planar top surface and an alignment projection,
    the alignment projection includes a pair of parallel side surfaces, the pair of parallel side surfaces directly projecting vertically upward from the planar top surface, the alignment projection shaped, configured, and positioned with respect to the planar top to constrain the solar panel to be aligned and secured to the planar top to only two directions that are orthogonal to each other and fixed with respect to the planar top;
    the alignment projection including a top surface;
    the top surface including a threaded fastener receiving aperture;
    a solar panel-mounting clamp, the solar panel-mounting clamp includes a top clamp portion and a side clamp portion;
    the pair of parallel side surfaces includes a first side surface and a second side surface;
    a threaded fastener;
    the threaded fastener engages and secures the solar panel-mounting clamp to the panel-mount by engaging the threaded fastener receiving aperture; and
    when secured an outside surface of the side clamp portion vertically aligned and co-planar with the first side surface.

2. The device for mounting a solar panel of claim 1, further including:
    a plurality of grounding pins projecting upwardly from the planar top;
    the planar top including peripheral edges defining an outside perimeter of the planar top; and
    the plurality of grounding pins arranged so at least one grounding pin is placed in each of four regions bound by lines extending outward from and parallel to adjacent sides of the alignment projection and by the peripheral edges.

* * * * *